United States Patent [19]

Yashiro et al.

[11] Patent Number: 5,767,895
[45] Date of Patent: Jun. 16, 1998

[54] CATV TELEPHONE SYSTEM

[75] Inventors: Kenji Yashiro, Tokyo-to; Tetsuichiro Sasada, Ichikawa, both of Japan

[73] Assignee: Pioneer Electronic Corporation, Tokyo-to, Japan

[21] Appl. No.: 535,616

[22] Filed: Sep. 28, 1995

[30] Foreign Application Priority Data

Oct. 6, 1994 [JP] Japan ................... 6-268334

[51] Int. Cl.$^6$ ........................ H04N 7/173
[52] U.S. Cl. ........................ 348/12; 455/5.1
[58] Field of Search ................... 348/6, 12, 13, 348/14, 15, 16, 17, 18, 7, 10, 11; 455/412, 5.1, 6.1, 6.2, 613; 370/486, 485, 487, 445, 448, 447, 330, 436, 478, 496, 490, 524, 437; H04N 7/16, 7/173

[56] References Cited

U.S. PATENT DOCUMENTS

| | | | |
|---|---|---|---|
| 4,868,811 | 9/1989 | Suzui | 370/436 |
| 4,891,694 | 1/1990 | Way | 358/86 |
| 5,029,333 | 7/1991 | Graves et al. | 370/58.1 |
| 5,124,980 | 6/1992 | Maki | 370/77 |
| 5,142,532 | 8/1992 | Adams | 370/94.1 |
| 5,185,738 | 2/1993 | Kelly | 370/95.1 |
| 5,189,673 | 2/1993 | Burton et al. | 370/110.1 |
| 5,488,413 | 1/1996 | Elder et al. | 348/13 |
| 5,499,241 | 3/1996 | Thompson et al. | 370/73 |
| 5,559,810 | 9/1996 | Gilbert et al. | 371/5.1 |
| 5,592,540 | 1/1997 | Beveridge | 348/13 |

*Primary Examiner*—Mark R. Powell
*Assistant Examiner*—Chris Grand
*Attorney, Agent, or Firm*—Kane,Dalsimer,Sullivan, Kurucz, Levy, Eisele and Richard, LLP

[57] ABSTRACT

A CATV telephone system includes a center device and a plurality of terminal devices connected by wired communication lines. The center device receives a request data from the terminal device, examines the frequency bands and the time slots currently occupied, allocates non-busy frequency bands and non-busy time slots to the transmission frequency band, the transmission time slot, the reception frequency band and the reception time slot, and notifies the allocation to the terminal device. Then, the terminal device transmits telephone data to the center device using the transmission frequency band and the transmission time slot designated by the center device, and receives telephone data from the center device using the reception frequency band and the reception time slot designated by the center device.

5 Claims, 8 Drawing Sheets

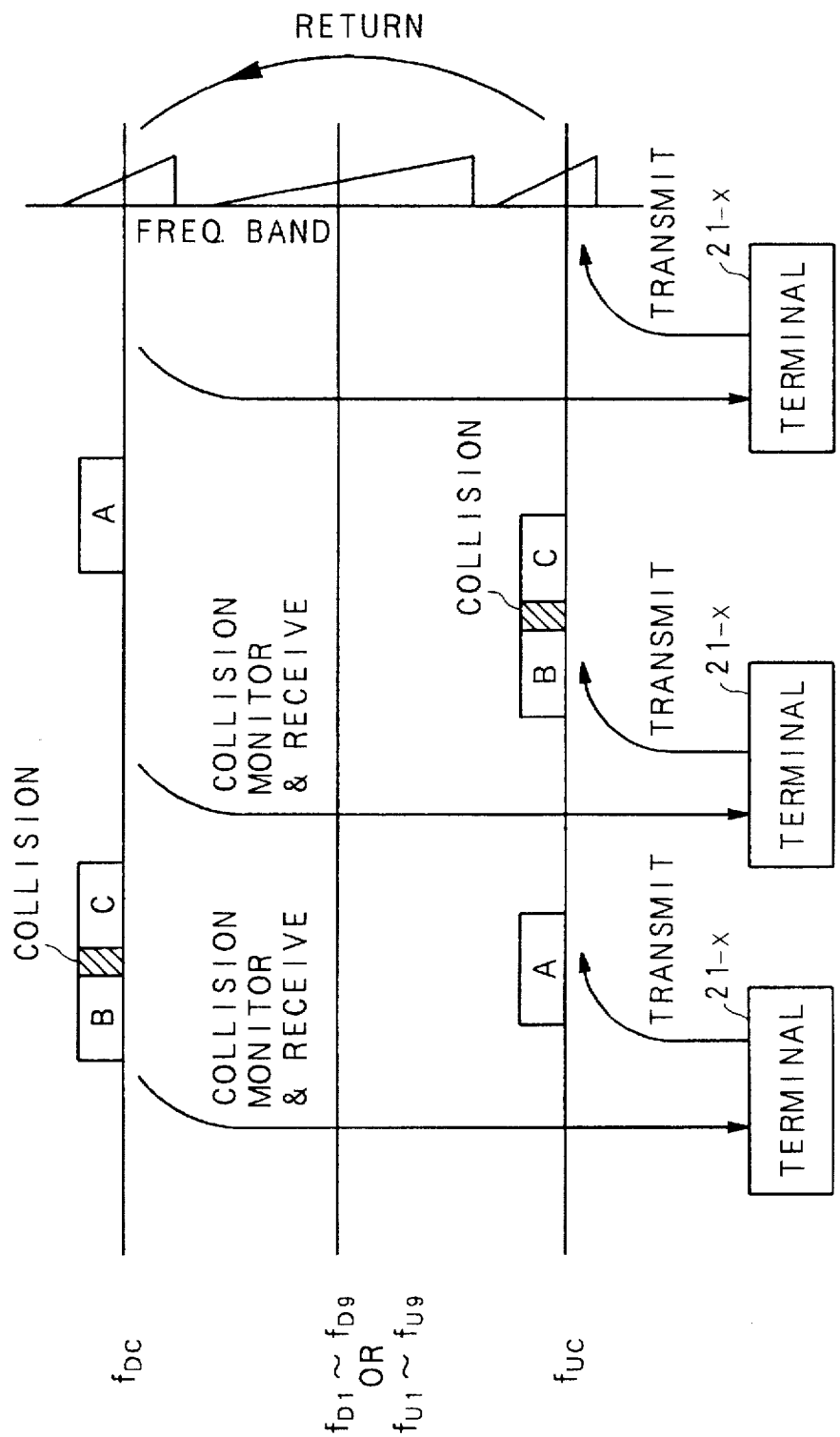

CATV TELEPHONE SYSTEM

BACKGROUND OF THE INVENTION

1. Field of the Invention

This invention relates to a CATV (Cable Television) system and devices for the same, and more particularly to a CATV system capable of providing a telephone service and devices for use in the system.

2. Description of the Prior Art

There is known a CATV system in which a center and household terminals are connected via communication cables such as coaxial cables or optical cables. In order to monitor the condition of the transmission line or to control particular ones of the household terminals (Addressable Control), the center communicates with the terminals using the bi-directional transmission line as a data communication line. The center generally includes a host computer for managing subscribers, line control units for controlling the household terminals, communication control devices for performing various communication controls, a headend including RF modems (a Frequency Shift Keying modulator and a Phase Shift Keying demodulator) and a condition monitoring computer for monitoring the operating conditions of line extender amplifiers. The household terminals generally include a communication micro-computer and a data receiver (an FSK demodulator; in the case of one-way communication terminal) or an RF modem (an FSK demodulator and a PSK modulator; in the case of bi-directional communication terminal). In case of the above-described CATV system, the frequency band of the transmission line is divided into two bands, one for up direction communication (from the terminals to the center) and the other for down direction communication (from the center to the terminals) to achieve the bi-directional communication by a single coaxial cable. Specifically, in the case of the system using the transmission frequency band 10 MHz–400 MHz, the frequency band 10 MHz–50 MHz is exclusively used for up direction communication while the frequency band 70–400 MHz is exclusively used for the down direction communication, with a guard band (50–70 MHz) arranged between them.

However, in the above described CATV system, the frequency band for the up direction communication is generally much narrower than that of the down direction communication. Although the capacity of the up direction frequency band satisfies the requirement for the response to the poling in which the center communicates with all the terminals with varying the address of them in turn, it is insufficient to provide the telephone service by the bi-directional communication like the manner of the telephone service by the existing normal telephone lines.

SUMMARY OF THE INVENTION

It is an object of the present invention to provide center device and terminal devices capable of providing the telephone service, like the system using the normal telephone line, utilizing the established CATV system.

According to one aspect of the present invention, there is provided a terminal device for use in a CATV telephone system which includes a center device and a plurality of terminal devices connected by wired communication lines. The terminal device includes: a unit for transmitting telephone data to the center device using a transmission frequency band and a transmission time slot prescribed for the transmission frequency band which are designated by the center device; and a unit for receiving telephone data from the center device using a reception frequency band and a reception time slot prescribed for the reception frequency band which are designated by the center device.

According to the device thus constructed, the data transmission and the data reception are performed equivalently by time-division multiplexing and frequency-division multiplexing. Therefore, many channels of telephone communication may be carried out using a relatively narrow frequency band.

According to another aspect of the present invention, there is provided a center device for use in a CATV telephone system which includes a center device and a plurality of terminal devices connected by wired communication lines. The center device includes: a unit for receiving a request data from the terminal device using a predetermined request transmission frequency band; a unit for examining of the frequency bands and the time slots currently occupied by the communication between the center device and the terminal devices; a unit for designating a transmission frequency band, a transmission time slot prescribed for the transmission frequency band, a reception frequency band and a reception time slot prescribed for the reception frequency band in accordance with a result of the examination by the examining unit; and a unit for transmitting data indicating the transmission frequency band, the transmission time slot, the reception frequency band and the reception time slot designated by the designating unit using a predetermined instruction frequency band.

According to the device thus constructed, the center device designates the frequency bands and the time slots only when the terminal device requests to communicate with the center device. Therefore, the efficiency of the usage of the telephone line may be improved. In addition, since the frequency bands and time slots are notified using the exclusive transmission line, the quality of the control may be improved.

According to still another aspect of the present invention, there is provided a center device for use in a CATV telephone system including a center device and a plurality of terminal devices connected by wired communication lines. The terminal device is connected with a personal communication system, band the center device includes: a unit for constantly and fixedly designating the transmission frequency band, a transmission time slot prescribed for the transmission frequency band, a reception frequency band and a reception the time slot prescribed for the reception frequency band to the terminal device connected with the personal communication system.

According to the device thus constructed, the personal communication system may be readily applied to the CATV system.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 6 is an explanatory diagram of the confirmation of the request of frequency band allocation;

DESCRIPTION OF THE PREFERRED EMBODIMENT

Preferred embodiments of the present invention will be described below with reference to the accompanying drawings.

1st Embodiment

Figure 1:
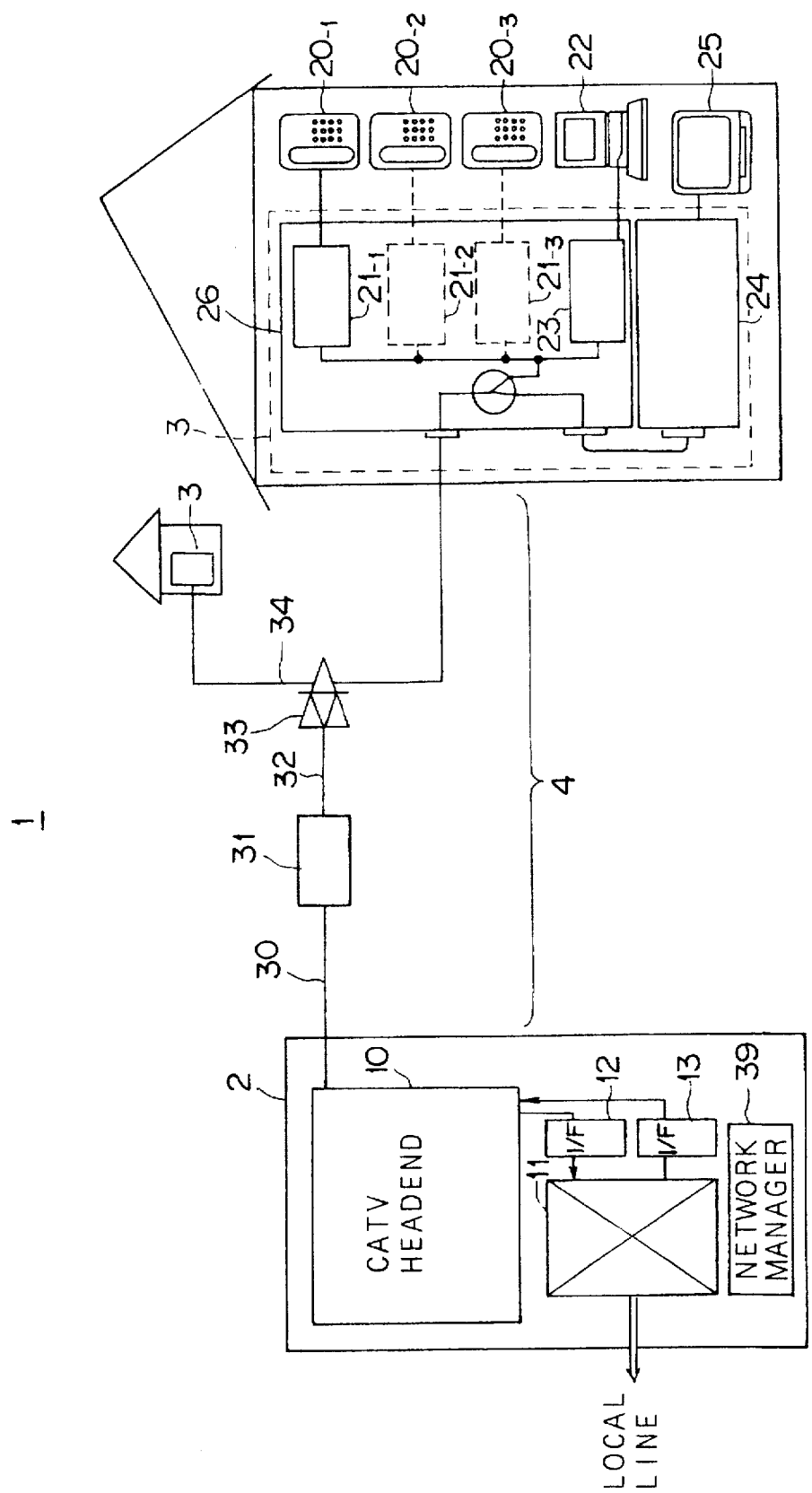
FIG. 1 is a block diagram illustrating a construction of a CATV telephone system according to the present invention.

FIG. 1 illustrates a construction of a CATV system according to the present invention. Roughly grouped, the CATV system includes a center 2 for performing total management and control of the system, terminals 3 equipped at subscriber's houses and a transmission line 4 for transmitting information from the center 2 to the terminals 3 and from the terminals 3 to the center 2. The center 2 includes a CATV headend 10, an exchanger 11, interfaces 12 and 13, and a network manager 39. The CATV headend 10 has an ability sufficient for data communication with approximately 20 thousands of subscribers, for example. The interface 12 supplies the telephone signal outputted from the CATV headend 10 to the exchanger 11 which is connected to the local line. The interface 13 receives the telephone signal from the exchanger 11 and supplies it to the CATV headend 10. The network manager 39 performs network control, and the exchanger 11 interconnects the CATV headend 10 with the local line.

Each of the terminals 3 includes a communication adapter 26 including telephone line modules 21 ($21_{-1}$ to $21_{-3}$) and a computer interface unit 23, and a TV converter 24. The telephone line module 21 interconnects the center 2 with a telephone 20 ($20_{-1}$ to $20_{-3}$), and the computer interface unit 23 interconnects the center 2 with a computer 22. The communication adapter 26 is connected to a TV 25 via the TV converter 24. Here, the telephone line modules 21 and the computer interface unit 23 function as a home interface device located at the subscriber's household (hereinafter referred to as "Premises Interface Device (PID)").

The transmission line 4 includes a fiber node 31 and a plurality of line extender amplifiers 33. The fiber node 31 is connected to the center 2 via an optical fiber 30 at one end thereof and is also connected to the line extender amplifiers 33, connected to the terminals 3, via a coaxial cable 32 at the other end thereof. The line extender amplifiers 33 are connected to the fiber node 31 via the coaxial cable 32, and performs data communication between the terminals 3 of the subscribers and the fiber node 31 via the coaxial cables 32 and 34.

Figure 2:
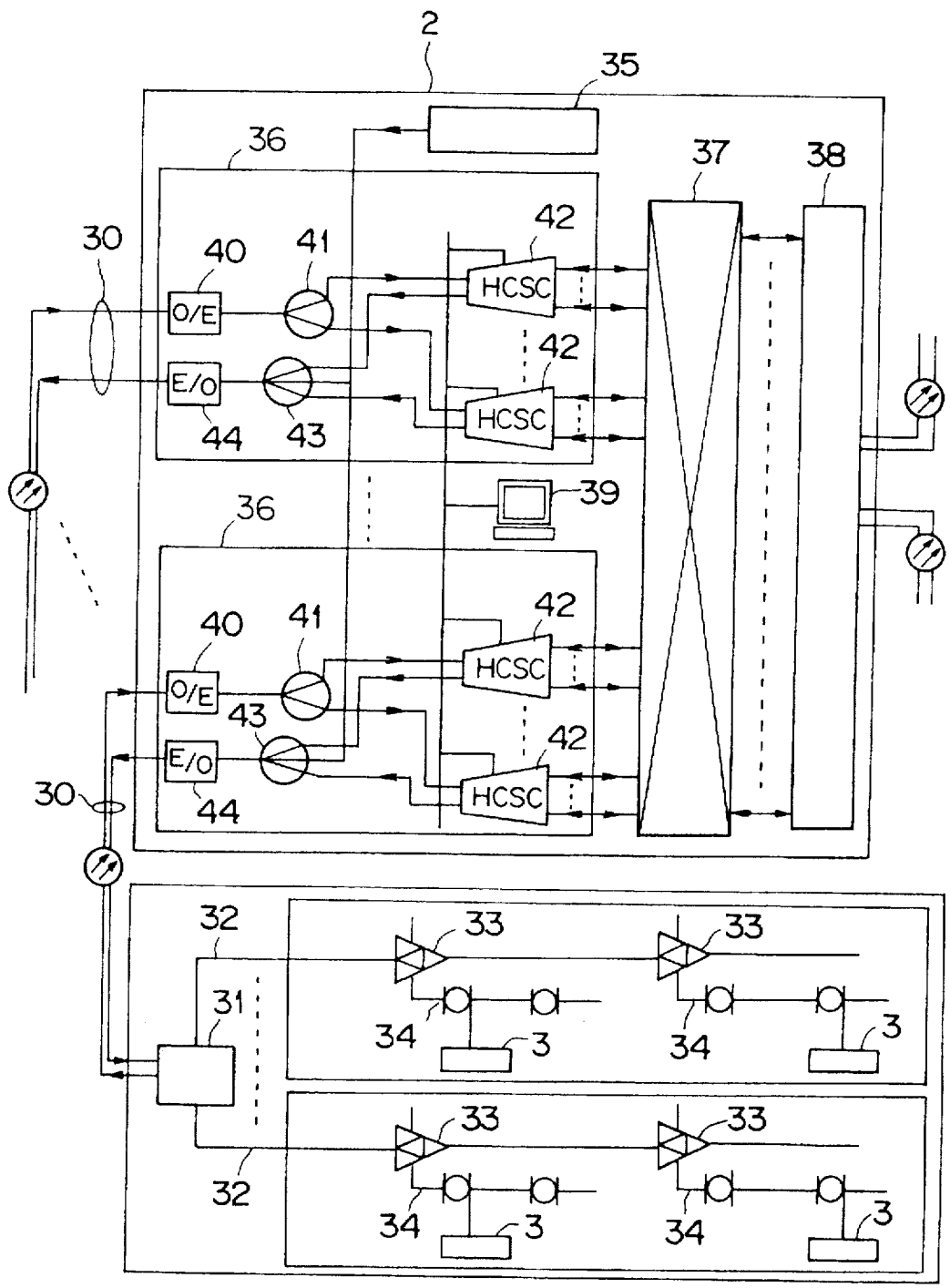
FIG. 2 is a block diagram illustrating a detailed construction of the system shown in FIG. 1.

FIG. 2 illustrates a detailed construction of the system shown in FIG. 1. As illustrated, the center 2 includes a broadcasting unit 35, a plurality of I/O interfaces 36, a local exchanger 37, a SONET (Synchronous Optical NETwork) 38 and the network manager 39. The broadcasting unit 35 transmits various data including image data to the terminals 3 by one-way communication. The I/O interface 36 performs interconnection between the local exchanger 37 and the optical fiber 30 connected to the fiber node 31. The local exchanger 37 communicates with the I/O interfaces 36 by transmitting and receiving the input telephone data (transmission data) which is frequency- and time-divided and the output telephone data (reception data) which is to be frequency- and time-divided. The local exchanger 37 further performs switching operation for communication with the local line. The SONET 38 further multiplexes the multiplexed input telephone data and supplies it to the fast optical communication network of the local lines, and the network manager 39 totally controls the I/O interface 36.

The I/O interface 36 includes photoelectric converters 40 and 44, frequency-division multiplexers 41 and 43 and Hybrid Cable Subscriber Carriers (HCSC) 42. The photoelectric converter 40 converts the optical signal from the fiber node 31 into an electric signal, and the frequency division multiplexer 41 conducts the frequency division multiplex onto the electric signal from the photoelectric converter 40. The HCSC 42 conducts the time-division multiplex onto the input signal from the frequency-division multiplexer 41 and supplies it to the exchanger 37 under the control of the network manager 39. The HCSC 42 also conducts the time-division multiplex onto the input signal from the exchanger 37, and outputs it. The frequency-division multiplexer 42 conducts the frequency-division multiplex onto the input signal from the exchanger 37, and the photoelectric converter 44 converts the output signal from the frequency-division multiplexer 43 into an optical signal.

Figure 3:
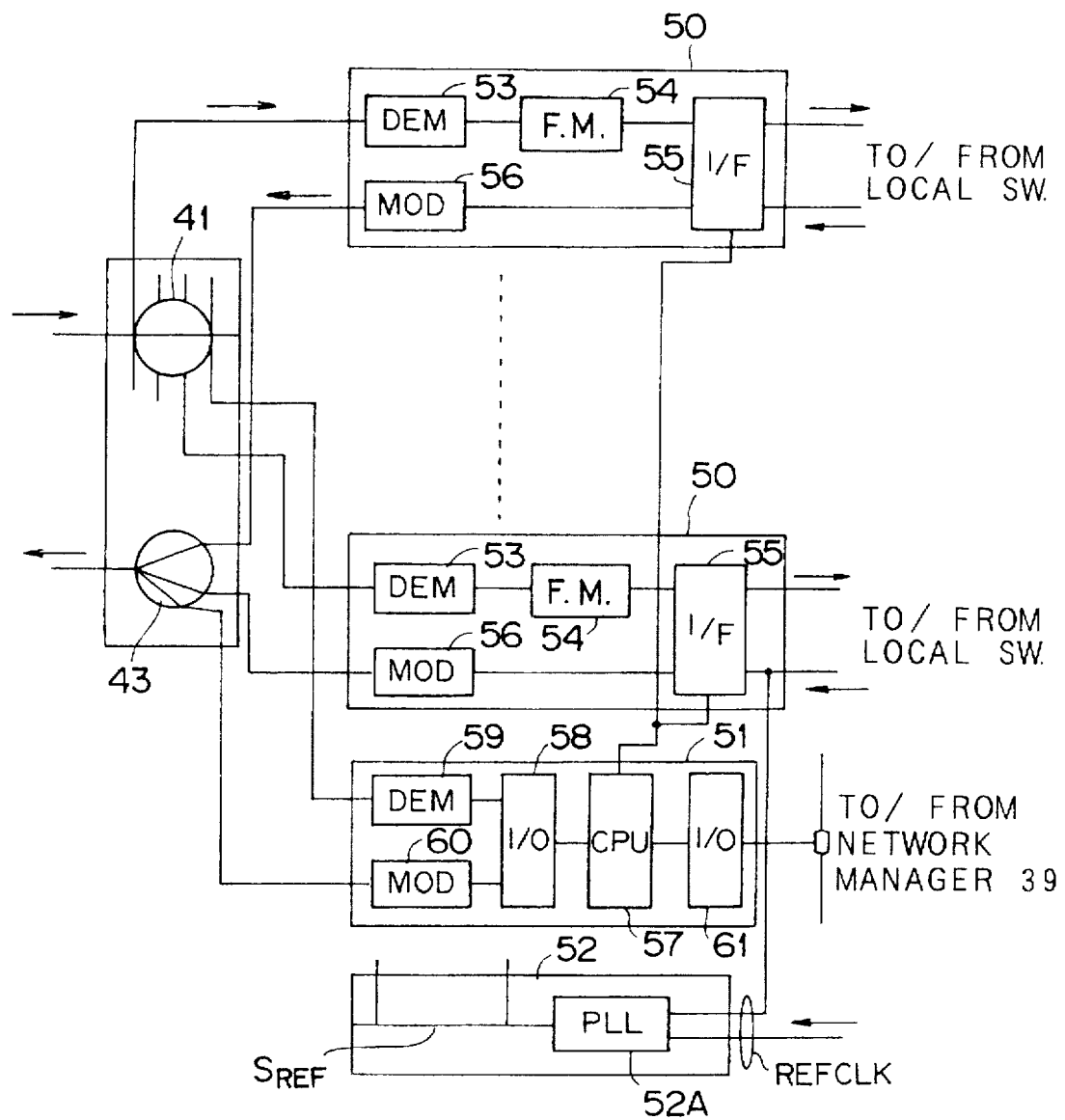
FIG. 3 is a block diagram illustrating a construction of the Hybrid Cable Subscriber Carrier (HCSC) shown in FIG. 2.

FIG. 3 illustrates the construction of the HCSC 42. As illustrated, the HCSC 42 includes a plurality of modems (modulator/demodulator) 50, a control modem 51 and a reference timing signal generator 52. The modem 50 demodulates the output signal of the frequency-division multiplexer 41 to supply it to the exchanger 37, and modulates the input signal from the exchanger 37 to supply it to the frequency-division multiplexer 43. The control modem 51 demodulates the output signal of the frequency-division multiplexer 41 to supply it to the network manager 39, and modulates the input signal from the network manager 39 to supply it to the frequency-division multiplexer 43. Additionally, the control modem 51 controls the respective modems 50. The reference timing signal generator 52 has a PLL (Phase Locked Loop) circuit 52A, and generates and outputs a reference timing signal $S_{REF}$ which is synchronous with a reference clock signal REFCLK or the input signal from the exchanger 37. The modem 50 includes a demodulator 53, a frame memory 54, an interface 55, and a modulator 56. The demodulator 53 demodulates the output signal from the frequency-division multiplexer 41 and outputs the demodulated signal, and the frame memory 54 stores the output signal of the demodulator 53 by a capacity of one frame. The interface 55 supplies the demodulated data stored in the frame memory 54 to the exchanger 37, and supplies the data from the exchanger 37 to the modulator 56. The modulator 56 modulates the data from the interface 55, and supplies the modulated data to the frequency-division multiplexer 43. The control modem 51 includes a CPU 57, I/O units 58 and 61, a demodulator 59 and a modulator 60. The CPU 57 controls the control modem 51 as a whole and controls the interfaces 55 of the modems 50. The demodulator 59 demodulates the output signal of the frequency-division multiplexer 41 and supplies the demodulated signal to the CPU 57 via the I/O unit 58. The modulator 60 receives the output data of the CPU 57 via the I/O unit 58, modulates it, and supplies the modulated signal to the frequency-division multiplexer 43. The I/O unit 61 performs interface operation between the CPU 57 and the network manager 39.

Figure 4:
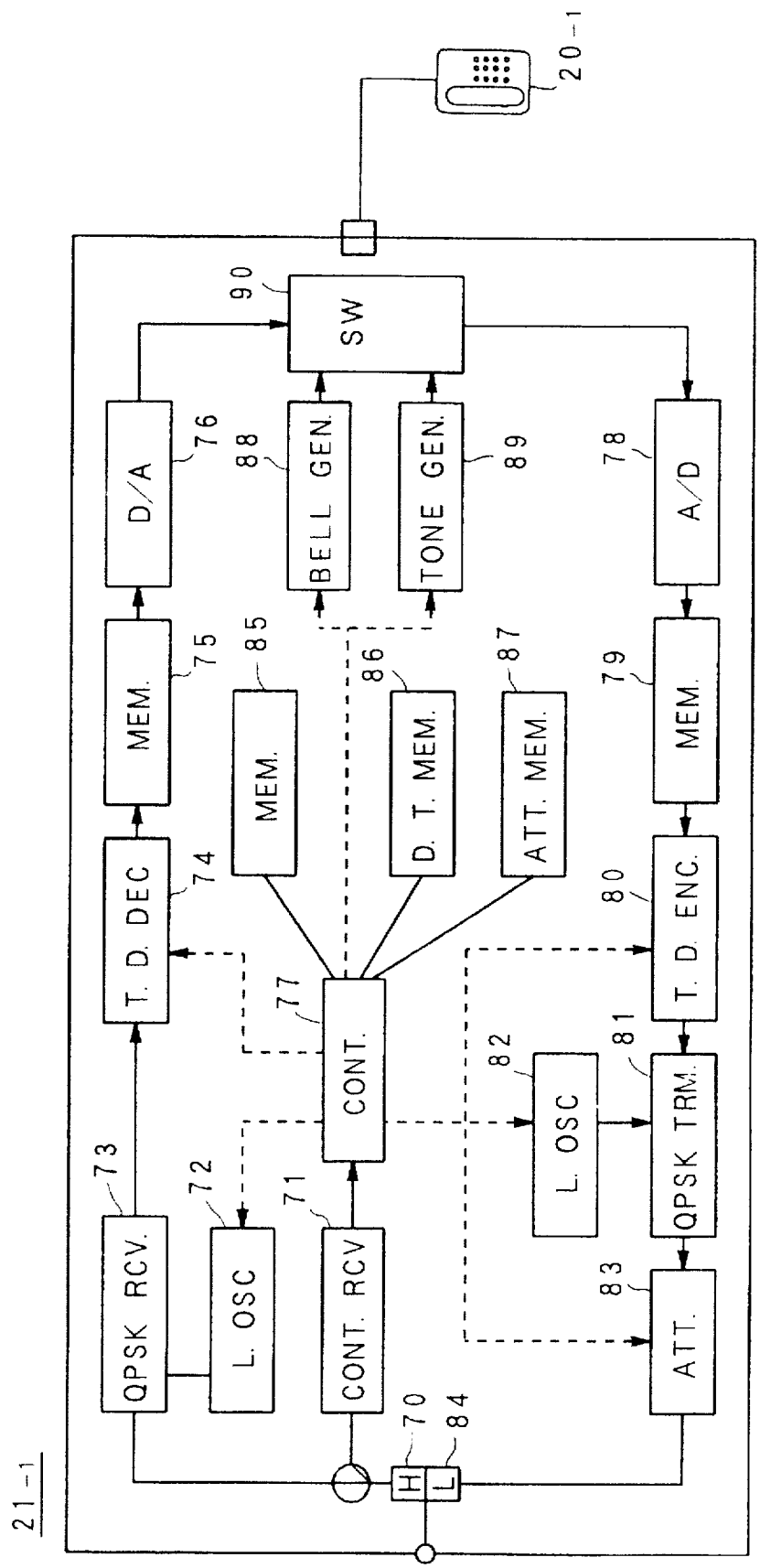
FIG. 4 is a block diagram illustrating a construction of the telephone line module shown in FIG. 1.

FIG. 4 illustrates the construction of the telephone line module 21 equipped in the terminal 3. As shown in FIG. 4, the High Pass Filter (HPF) 70 exclusively passes signal of down direction frequency band so as to extract only the down direction data. The control receiver 71 selects and receives only the control data in the down direction data and performs necessary control. The local oscillator 72 generates a first reference oscillation signal, and the QPSK receiver 73 selects and receives only audio data (time-division multiplexed compressed data) corresponding to the actual acoustic signal out of the down direction data on the basis of the first reference oscillation signal. The time-division multiplex decoder 74 decodes and expands the received audio data into an original audio data. The memory 75 stores the decoded and expanded audio data, the D/A converter 76 converts the audio data into an analog audio signal, and the controller 77 controls the telephone line module 21 as a whole. The A/D converter 78 converts the analog audio signal from the telephone 20 into digital audio data, and the memory 79 temporarily stores the digital audio data. The time-division multiplex encoder 80 conducts time-division multiplex compression onto the digital audio data and outputs the time-division multiplex compressed audio data under the control of the controller 77. The local oscillator 82 generates a second reference oscillation signal, and the QPSK transmitter 81 transmits the time-division multiplex compressed audio data based on the second reference oscillation signal. The attenuator 83 controls the transmission level of the QPSK transmitter 81, based on the control data supplied via the control receiver 71 and the controller 77, so that the signal reception level at the center 2 becomes a predetermined level. Therefore, the center 2 can constantly receive data of satisfactory level from the terminals 3, thereby the communication may be reliable. The Low Pass Filter (LPF) 84 exclusively passes signal of up direction frequency band so as to passes only the up direction signal. The memory 85 temporarily stores data transmitted via the an exclusive control line and other data, and the non-voluntary delay-time memory 86 memorizes the transmission delay time in conformity with the environments where the telephone line module 21 is positioned. The non-voluntary attenuation value memory 87 memorizes the level of the attenuator 83. The bell drive signal generator 88 generates a bell drive signal under the control of the controller 77, and the tone signal generator 89 generates a tone signal under the control of the controller 77. The switcher 90 selectively connects, to the telephone 20, either the pair of the D/A converter 76 and the A/D converter 78 or the pair of the bell drive signal generator 88 and the tone signal generator 89.

Figure 5:
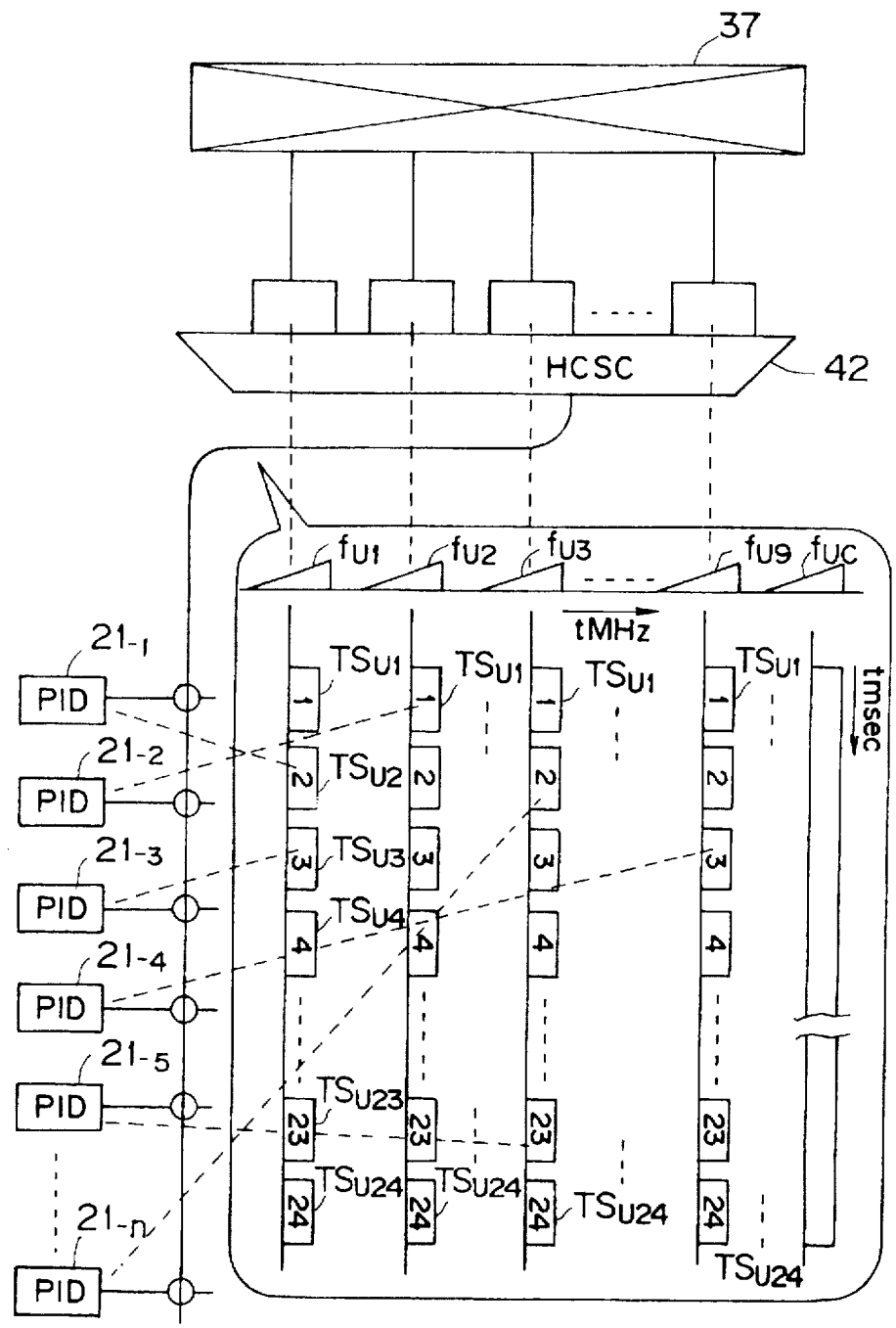
FIG. 5 is an explanatory diagram of the communication manner according to the present invention.

Next, basic operation of the telephone communication will be described with reference to FIG. 5. It is noted that the operation of up direction communication (from terminals to the center) will be mainly described below because the up direction communication and the down direction communication (from center to the terminals) are fundamentally identical to each other. Within the up direction frequency band, ten sub-frequency bands are arranged so as to achieve frequency-division multiplex, and nine sub-frequency bands out of them are used for normal communication (hereinafter referred to as "first to ninth normal communication frequency bands $f_{U1}$–$f_{U9}$") while one sub-frequency band is used for control communication (hereinafter referred to as "control communication frequency band $f_{UC}$") In addition, each of the sub-frequency bands are divided into 24 communication time periods (hereinafter referred to as "time slot") $TS_{U1}$–$TS_{U24}$. Similarly, within the down direction frequency band, ten sub-frequency bands $f_{D1}$–$fD_9$ and $f_{DC}$ are arranged, and 24 time slots $TS_{D1}$–$TS_{D24}$ are allocated in each of the normal communication frequency bands $f_{D1}$–$f_{D9}$. It is assumed that the data transfer rate per one time slot is 64 kbits/sec.

When detecting that the telephone 20 becomes off-hook condition, i.e., the telephone receiver thereof is taken up by the user, the controller 77 provided in the telephone line module 21, serving as the PID, controls the time-division multiplex encoder 80, the QPSK transmitter 81 and the attenuator 83 to transmit a request data, to the center 2 using the control communication frequency band $f_{UC}$, for requesting the center 2 to allocate an operable (non-busy) communication frequency band and an operable time slot in the communication frequency band and for informing the result to the telephone line module 21.

Here, the description will be presented how to confirm the safe transfer of the request data to the center 2 with reference to FIG. 6. The terminal 3 transmits the address data of its own and the request data using the control communication frequency band $f_{UC}$. On receiving the data, the center 2 returns the same data to the terminal using control communication frequency band $f_{DC}$. For example, if the terminal 3 sends the data A (see. FIG. 6) and then receives the return data A, the PID in the terminal 3 recognizes that the transmission of the request data is successful and keeps waiting state until the following operation is performed. On the contrary, if two PIDs in two different terminals 3 send, respectively, the data B and C almost simultaneously using the control communication frequency band $f_{UC}$, they collide with each other as shown in FIG. 6, and the center 2 returns the same collided data using the control communication frequency band $f_{DC}$. Therefore, each of the PIDs receives the collided data and judges that the transmission line is busy because the transmitted data (B or C) is not coincident with the received data. Then, the PIDs set the waiting time randomly, and try to communicate with the center 2 in the same manner for a predetermined times, respectively, until the communication becomes successful, i.e., until the data identical to the transmitted data is received as the return data. According to the above control, each of the PID may send the data asynchronously with each other, and hence the control may be simplified and facilitated. Additionally, the transmission of the address data and the request data may be completed in relatively short time in comparison with the case of the synchronous data transmission. Further, even in a case that the data transmission times from the terminals have relatively large difference due to the difference of the distances from the center 2, the collision of the transmitted data may be stably detected. In this manner, it is confirmed whether the request data is safely transmitted to and received by the center 2 or not.

When the center 2 receives the request data, the network manager 39 notifies the non-busy (i.e., currently not allocated to any PID yet) communication frequency band of up direction, non-busy time slot of the frequency band, the non-busy communication frequency band of down direction and the non-busy time slot of the frequency band to the terminal which has issued the request data, using the control communication frequency band $f_{DC}$, with the address data for identifying the PID. Specifically, assuming that the telephone line module $21_{-2}$ has sent the request data as shown in FIG. 5, the network manager 39 in the center 2 designates the up-direction communication frequency band $f_{U2}$, the up-direction time slot $TS_{U1}$, the down-direction communication frequency band and the down-direction time slot, and notifies them to the PID using the frequency band $f_{DC}$ with the address data identifying the telephone line module $21_{-2}$. Thereafter, the telephone line module $21_{-2}$ which has sent the request data communicates with the center 2 using the communication frequency bands and the time slot designated by the network manager 39 in the above-described manner. According to the above operation, the following number of communication lines can be made simultaneously operable:

24 (number of the time slots in a single frequency band)×9 (number of frequency bands)=216 (lines).

Therefore, assuming that the loss probability is 0.001 (one order smaller than a general value), more than two thousands households can communicate with each other.

When the network manager 39 cannot find any non-busy frequency band and time slot in response to the request data, the network manager 39 sends the control data indicating the busy state of the communication line via the control communication frequency band $f_{DC}$ of down-direction. In response, the controller 77 controls the tone signal generator 89 to generate the tone indicating that the communication line is busy.

The above described first embodiment is readily applicable to an existing CATV system in which bi-directional communication is ensured between the center unit and the line extender amplifiers, thereby establishing a telephone system having the loss probability and the communication line numbers similar to those of the public telephone system by making an effective use of the established CATV system. Further, since the frequency bands and the time slots to be used are determined every time the communication is to be started, there is no possibility that only some of the telephones connected to a certain terminal be usually under poor communication condition due to the inherent noisy characteristics of the frequency band.

In addition, according to the device thus constructed, the center 2 designates the frequency bands and the time slots only when the terminal 3 requests to communicate with the center 2. Therefore, the efficiency of the usage of the communication line may be improved. In addition, since the frequency bands and time slots are notified using the exclusive transmission line, the quality of the control may be improved.

2nd Embodiment

Figure 7A:
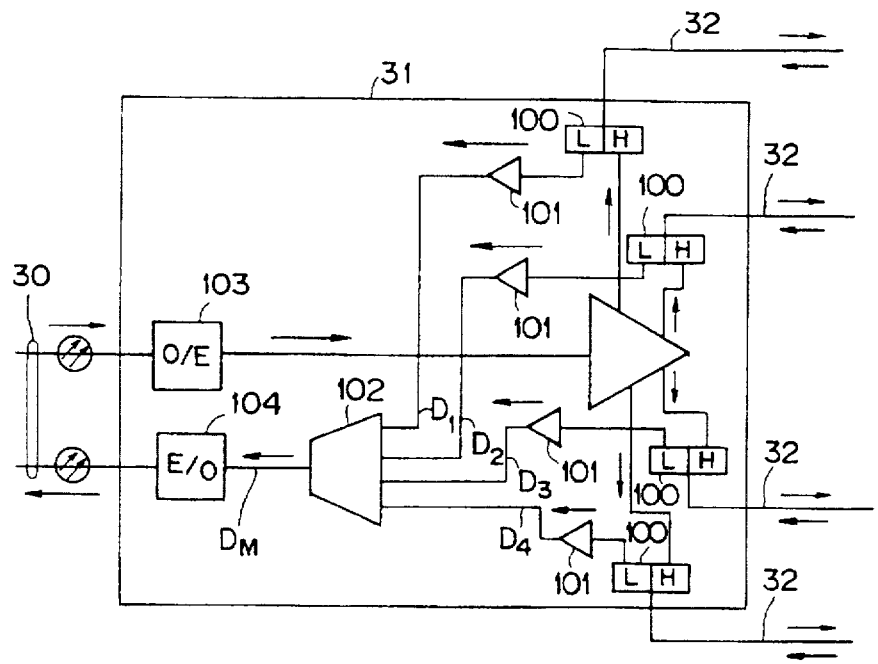
FIGS. 7A–7D are explanatory diagrams of the operation of the second embodiment.
Figure 7B:
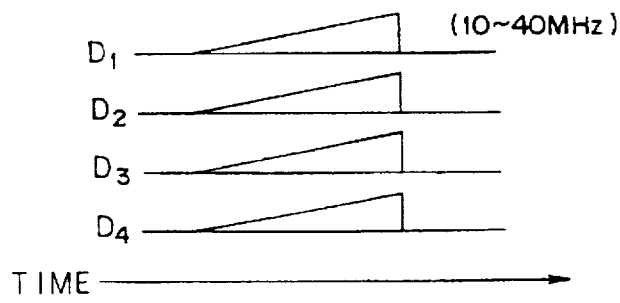

In use of the system of the first embodiment, if plural (e.g. 4) terminals 3 connected to a single PID simultaneously send data (e.g., $D_1$ to $D_4$) to the center 2, the data possibly collide with each other as shown in FIG. 7B because the terminals 3 commonly use the same frequency band. In order to avoid this drawback, only one terminal 3 may be made operable and the communication of the others may be inhibited. However, this decreases the transmission efficiency. The second embodiment described below will overcome this, that is, decreases the waiting time of the terminals and achieves efficient data transmission.

Figure 7C:
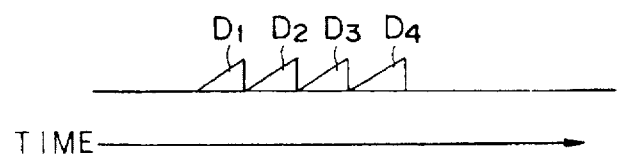
Figure 7D:
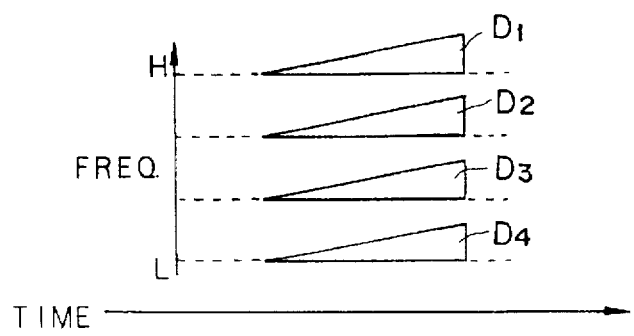

FIG. 7A illustrates the construction of the fiber node 31 according to the second embodiment. As shown, the fiber node 31 includes photoelectric converters 103 and 104, a multiplexer 102, buffer amplifiers 101 and LPFs 100. As seen from FIG. 7A, data $D_1$ to $D_4$ inputted from the plural terminals 3 (not shown in FIG. 7A) connected to the coaxial cables 32 are supplied to the multiplexer 102, via the LPF 100 and the buffer amplifier 101, which conducts data compression and time division multiplexing to produce the data $D_1$ to $D_4$ shown in FIG. 7C. Then, the compressed data $D_1$ to $D_4$ are supplied to the center 2 via the photoelectric converter 104 and the optical fiber 30. In this way, the waiting time of the terminal 3 is decreased, thereby accomplishing the efficient data communication. While the multiplexer 102 conducts time division multiplex after the data compression in the above description, the transmission frequencies of the data $D_1$ to $D_4$ may be shifted so as to multiplex them by frequency division multiplexing, as shown in FIG. 7D.

3rd Embodiment

In the above-described embodiments, the positions in time of the time slots are fixed. However, if the delay time of the transmission line between the PID and the HCSC is large, the HCSC accessing the transmission line at the timings of the designated time slot may possibly fails to receive the transmitted data or the data collision may happen. In this connection, the delay time of the transmission line is a fixed value in the CATV system in theory when the arranging condition of the terminal is determined. In this view, according to the third embodiment, the delay time of the transmission line is detected in advance at the time of the setting of the system, and the delay time memory 86 stores an appropriate delay time of the time slot with respect to the reference signal (clock) so that the HCSC can accurately get the data at the timing prescribed by the reference signal and the delay time. In this case, the time slots $TS_1$ to $TS_{24}$ should be shifted in time collectively by the identical delay time so as to avoid the data collision. Therefore, the delay time of the transmission line is detected for each of the terminals on the same transmission line, and the delay time is determined so that the data from the terminals reach to the center at the same timing. In this way, according to the third embodiment, the transmitted data may be stably taken in, and the reliability of the data transmission may be improved.

4th Embodiment

In the above-described embodiments, the normal communication frequency bands and the control communication bands are fixed. However, in practice, some frequency bands may particularly be noisy due to the intermixture of signal from the amateur radio, the signal of certain frequency generated by transformers or noise resulting from the arc welding. In this view, in the fourth embodiment, the center 2 periodically monitors and evaluates the quality of transmission frequency band (i.e., the degree of noise intermixture), and inhibits the use of the noisy frequency band for the communication, thereby improving the reliability and the quality of the communication. The quality of the communication frequency band is checked as follows. First, the center 2 notifies the non-used terminal that the quality check will be started, and then sends the data for quality check via the normal communication frequency band subjected to the quality check. On the other hand, the terminal has stored in advance the data for quality check. When receiving the data for the quality check, the terminal compares the transmitted data with the stored data, calculates the error rate statistically, and detects the frequency bands of insufficient quality (i.e., having larger error rate than a reference allowable value). Based on the result, the network manager 39 decides not to use the frequency band thus detected as the normal and control communication frequency band. In this way, high quality communication may be ensured. In addition, the quality check may be performed at different times to evaluate transmission quality in consideration of the time of the day. Then, the use of the frequency band may be inhibited at the time periods when the frequency band is noisy.

5th Embodiment

FIG. 8 is an explanatory view of the fifth embodiment. In the fifth embodiment the CATV system of the present invention is applied to a portable telephone called a Personal Communication System (PCS). The PCS has the construction similar to the wireless telephone and modified to suit the outdoor use, and PCS nodes are provided at many positions in the cities in stead of the parent device of the wireless telephone so as to achieve the similar function. The PCS has such a disadvantage that it is not operable in a vehicle such as a car or a train and only operable within a certain range from the PCS node. However, it has such an advantage that the PCS nodes can be set everywhere even in the subway because of its small feature and low cost, compared with the trunk station of the general portable telephone system, thereby the operable area may be broadened.

Figure 8A:
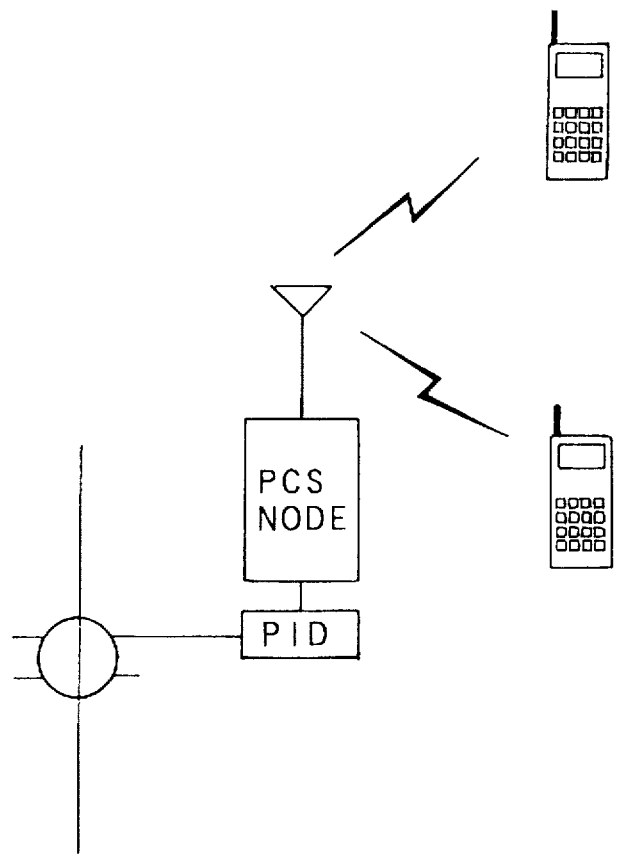
FIGS. 8A and 8B are explanatory diagrams of the operation of the fifth embodiment.
Figure 8B:
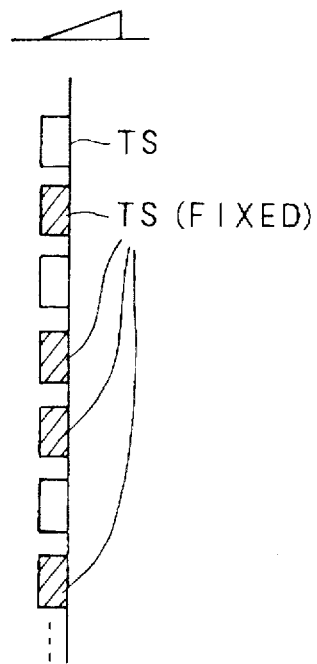

The data transmission rate of the PCS currently under examination is 32 kbits/sec., and hence the systems according to the above-described embodiments have a sufficient ability to be applied to PCS because the data transmission rate of the single time slot is 64 kbits/sec. In this view, the PCS type telephones may be used with the CATV system of this invention. Namely, by connecting the PIDs of this invention to the PCS nodes and exclusively and constantly using plural time slots (e.g., 4) for the PCS telephones, as shown in FIGS. 8A and 8B, plural (e.g., 2) PCS telephones may be operable. The reason why the specific time slots are constantly used to the PCS telephones is that this treatment may enable the PCS exchanger to maintain necessary capacity of communication lines without monitoring occupation of the communication lines frequently.

As described above, according to the fifth embodiment, the PCS telephones may be introduced to the CATV system by simply building the PIDs in the existing PCS nodes. Thus, the application of the CATV system may be widened.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A center device for use in a CATV telephone system which comprises a center device and a plurality of terminal devices connected by a communication line, said center device comprising:

means for receiving a request data from one of said terminal devices using a predetermined request transmission frequency band;

means for examining frequency bands and time slots currently occupied by the communication between the center device and the terminal devices;

means for designating a transmission frequency band, a transmission time slot prescribed for the transmission frequency band, a reception frequency band and a reception time slot prescribed for the reception frequency band in accordance with a result of the examination by the examining means;

means for transmitting to the one terminal device data indicating the transmission frequency band, the transmission time slot, the reception frequency band and the reception time slot designated by said designating means using a predetermined instruction frequency band;

means for evaluating transmission quality of the communication line for each of the frequency bands and detecting unsatisfactory frequency bands which do not have a predetermined allowable transmission quality;

means for storing a result of the quality evaluation; and means for inhibiting said designating means to designate the unsatisfactory frequency bands to the transmission frequency band and the reception frequency band.

2. A center device according to claim 1, wherein at least one of said plurality of terminal devices is connected with a personal communication system.

3. A CATV telephone system comprising a center device according to claim 5 and a plurality of such terminal devices connected by a wired communication line, said one terminal device comprising:

means for transmitting a request data requesting said center device to designate the transmission frequency band, the transmission time slot, the reception frequency band and the reception time slot to said center device using a predetermined request transmission frequency band;

means for transmitting telephone data to said center device using a transmission frequency band and a transmission time slot prescribed for the transmission frequency band which are designated by said center device; and means for receiving telephone data from said center device using a reception frequency band and a reception time slot prescribed for the reception frequency band which are designated by said center device.

4. A system according to claim 9, wherein said one terminal device further comprises:

means for receiving a level adjustment data from said center device; and means for adjusting a level of the telephone data to be transmitted based on the level adjustment data so that the level of the telephone data received by the center device becomes a predetermined level.

5. A system according to claim 9, wherein said one terminal device further comprises means for generating a tone indicating that the communication line is busy when one the terminal device receives a busy data from the center device indicating that the center device cannot designate at least one of the transmission frequency band, the transmission time slot, the reception frequency band and the reception time slot.

* * * * *